(12) United States Patent
Emerson et al.

(10) Patent No.: US 8,077,841 B2
(45) Date of Patent: Dec. 13, 2011

(54) SYSTEM AND METHOD FOR AN OUTBOUND GREETING

(75) Inventors: David Emerson, Overland Park, KS (US); David E. Rondeau, Olathe, KS (US); Gary Lafreniere, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1202 days.

(21) Appl. No.: 11/823,600

(22) Filed: Jun. 28, 2007

(65) Prior Publication Data

US 2009/0003555 A1 Jan. 1, 2009

(51) Int. Cl.
*H04M 1/64* (2006.01)
(52) U.S. Cl. ..................... 379/88.22; 379/88.1
(58) Field of Classification Search ......... 379/69–88.28; 709/202, 203, 206, 207
See application file for complete search history.

(56) References Cited

U.S. PATENT DOCUMENTS

| | | | | |
|---|---|---|---|---|
| 4,625,081 A * | 11/1986 | Lotito et al. | ............... | 379/88.26 |
| 5,222,120 A * | 6/1993 | McLeod et al. | ............ | 379/88.24 |
| 5,499,196 A * | 3/1996 | Pacheco | ........................ | 702/81 |
| 5,646,982 A * | 7/1997 | Hogan et al. | ................ | 379/88.22 |
| 5,754,627 A | 5/1998 | Butler et al. | | |
| 6,028,922 A | 2/2000 | Deutsch et al. | | |
| 6,195,418 B1 * | 2/2001 | Ridgley | ...................... | 379/88.23 |
| 6,201,814 B1 * | 3/2001 | Greenspan | ..................... | 370/428 |
| 6,226,360 B1 * | 5/2001 | Goldberg et al. | ............... | 379/69 |
| 7,088,810 B1 * | 8/2006 | Burg | ....................... | 379/201.02 |
| 2003/0064711 A1 | 4/2003 | Gilbert et al. | | |
| 2005/0114768 A1 * | 5/2005 | Atkin et al. | .................... | 715/530 |
| 2005/0147212 A1 | 7/2005 | Benco et al. | | |
| 2005/0232253 A1 * | 10/2005 | Ying et al. | ..................... | 370/356 |
| 2006/0262911 A1 * | 11/2006 | Chin et al. | ................. | 379/88.18 |
| 2007/0047702 A1 * | 3/2007 | Newell et al. | ............ | 379/101.01 |
| 2007/0177717 A1 * | 8/2007 | Owens et al. | ................. | 379/67.1 |
| 2009/0003551 A1 | 1/2009 | MacIsaac | | |

OTHER PUBLICATIONS

Non-Final Office Action date mailed Jun. 18, 2010 for U.S. Appl. No. 11/897,412.
Response filed Sep. 20, 2010 for U.S. Appl. No. 11/897,412.

* cited by examiner

*Primary Examiner* — Simon Sing
*Assistant Examiner* — Assad Mohammed
(74) *Attorney, Agent, or Firm* — Patton Boggs LLP

(57) ABSTRACT

A system and method for sending an outbound greeting. User input is received specifying a recipient, a date, and a time for delivery of the outbound greeting. The outbound greeting is received. The outbound greeting is stored for future delivery. A call is initiated to the recipient in response to the date and the time specified by the user input being met.

20 Claims, 6 Drawing Sheets

FIG. 6

| | Outbound Greeting GUI    500 | |
|---|---|---|
| 602 | Account Number 1234567    Date: June 21, 2010 | |
| 604 | Username: Demer | |
| 606 | Password: ******** | |

608  ✓  Record an outbound greeting

610  [Recipient ▼]  Phone numbers in order:  999-999-9989  612
                                              999-999-9939

Date & Time for greeting delivery

612  Date [ 7/3/10 ]  Time [ 8:30 p.m. ]  614

616  ⊗ Record   618 ▽ Stop

620  Preferences

✓ Prompt recipient to connect directly with
   you after the outbound greeting is played?
   ✓ Pay for call?

✓ Prompt recipient to leave you a message?

☐ Transfer outbound greeting to voicemail if recipient is unavailable?

✓ Retry outbound greeting delivery?
   ✓ Specify interval __45 minutes__

SYSTEM AND METHOD FOR AN OUTBOUND GREETING

BACKGROUND

Many individuals have become increasingly busy in recent years. The increased level of activity is brought on by increased business, social, and other demands. Advances in technology and communications in particular have further increased and promoted available activities. Despite new communications technologies, maintaining and sending messages and fostering relationships maybe very demanding. As a result, important communications are frequently performed at the wrong time, incompletely, or skipped altogether.

Many users are required or desire to communicate important messages not only as part of business, but also to maintain important social bonds and relationships with family, friends, and associates. Maintaining social ties is important for psychological and emotional health. In particular, face-to-face and voice conversations and messages provide a very personal form of communication through which a user may efficiently convey content, emotions, and personality. Electronic communications such as email, text messages, and faxes do not provide a method of conveying emotion, content, and context that maybe distinguished and expressed by the human voice.

Finding the time and remembering to make calls or send important messages prevent many people from performing important communication. As a result, many users may give up trying to perform the different types of communications to their detriment and the detriment of those with whom they desire to communicate.

SUMMARY

One embodiment includes a system and method for sending an outbound greeting. User input maybe received specifying a recipient, a date, and a time for delivery of the outbound greeting. The outbound greeting may be received. The outbound greeting may be stored for future delivery. A call may be initiated to the recipient in response to the date and the time specified by the user input being met.

Another embodiment includes a voicemail system for processing an outbound greeting. The voicemail system may include a function trigger for initiating an outbound greeting feature in response to receiving user input specifying a recipient, a date, and a time for delivery of the outbound greeting. The voicemail system may include outbound greeting logic configured to store the outbound greeting received from a user for future delivery and initiate a call to the recipient in response to the date and the time specified by the user input being met.

Yet another embodiment includes a voicemail server. The voicemail server may include a processor for executing a set of instructions and a memory for storing the set of instructions. The set of instructions are configured to receive user input specifying a recipient, a date, and a time for delivery of the outbound greeting, record the outbound greeting for future delivery, and initiate a call to the recipient in response to determining the date and the time specified by the user input are met.

BRIEF DESCRIPTION OF THE DRAWINGS

Illustrative embodiments of the present invention are described in detail below with reference to the attached drawing figures, which are incorporated by reference herein and wherein:

FIG. 6 is a graphical user interface for receiving user input for recording an outbound greeting in accordance with an illustrative embodiment.

DETAILED DESCRIPTION OF THE DRAWINGS

Illustrative embodiments of the present invention provide a system and method for sending an outbound greeting. The outbound greeting may be a message, greeting, or other voice communication expressed from a user to a recipient. In another embodiment, the outbound greeting may be a text, video, picture, and other types of media message. The outbound greeting may be prerecorded for delivery at a specified time. As a result, the user may plan for important events, dates, or happenings while the memory or importance of the communication is fresh in the user's mind. For example, an outbound greeting may be set for each of the user's family members birthdays on specified days throughout the year. Similarly, the user may plan outbound greetings or messages with regard to important conferences, sales meetings, deadlines, or other important events for coworkers and customers.

Figure 1:
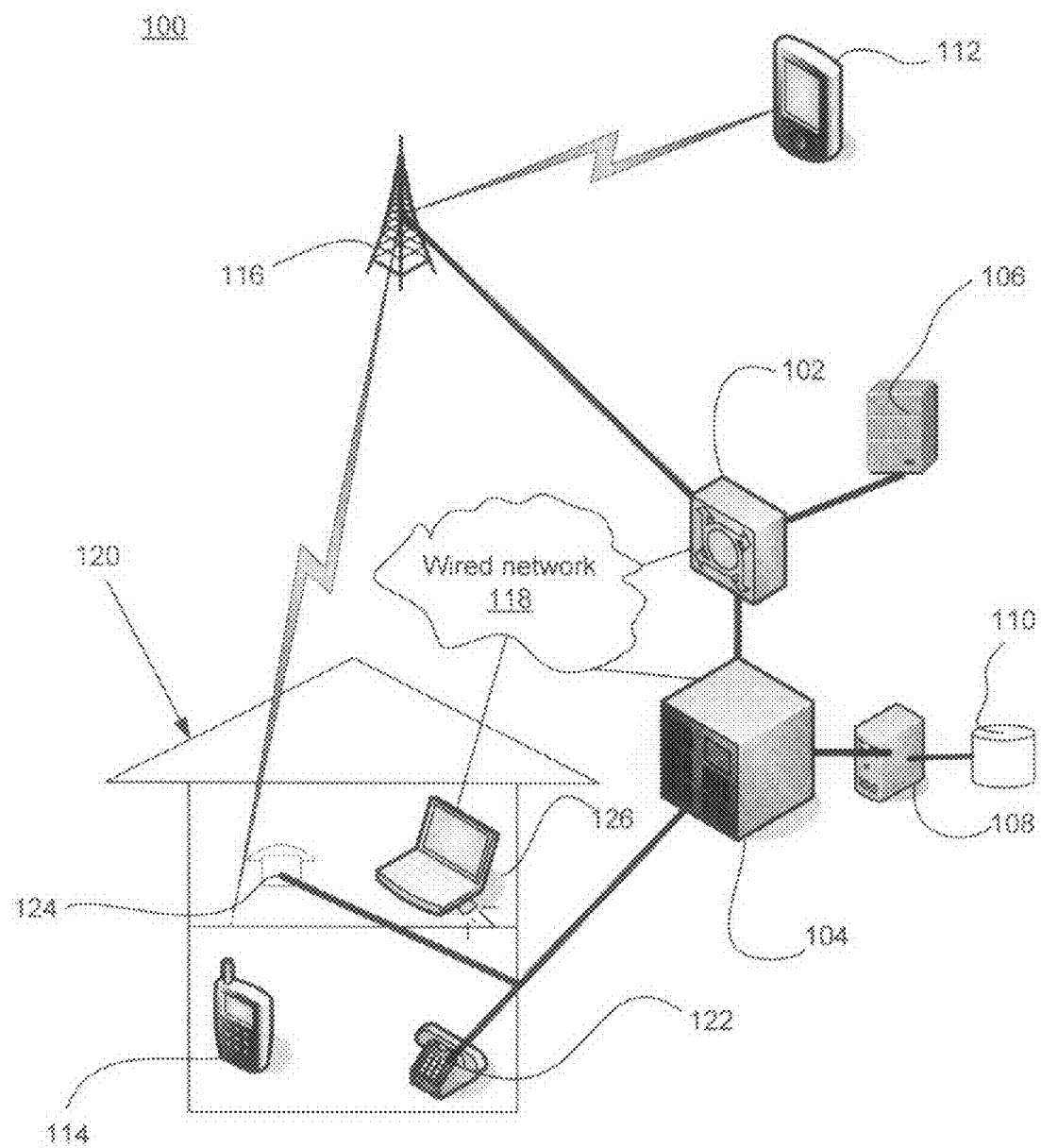
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. The communications system 100 includes a mobile switching center 102, a local exchange 104, voicemail systems 106 and 108, a database 110, wireless devices 112 and 114, a transmission tower 116, a wired network 118, a home 120, home telephones 122 and 124, and a client 126. In one embodiment, the different elements and components of the communications system 100 communicate using wireless communications including satellite connections or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLA, WiMAX, or other frequently used cellular and data communications protocols and standards. The wireless devices 112 and 114 may include cellular phones, Blackberry®, personal digital assistances (PDA), laptops, evolution data optimized (EDO) cards, multi-mode devices, and other wireless communication devices and elements.

Communications within the communications system 100 may occur on any number of networks which may include wireless networks, data or packet networks, private networks, publicly switched telephone networks (PSTN), and the wired network 118. The networks of the communications system 100 may represent a single communication service provider or multiple communications services providers. The features of the embodiments may be implemented by one or more elements of the communications system 100 independently or as a networked implementation.

In one embodiment, the mobile switching center 102, voicemail system 106, and transmission tower 116 are part of a wireless network that is operated by a wireless service provider. For example, the control signals and operational features maybe performed by the mobile switching center 102 and the wireless signals maybe broadcast from the transmission tower 116 to the wireless devices 112 and 114. The wireless network may include any number of systems, towers, servers, and other network and communications devices for implementing the features and performing the methods herein described.

The mobile switching center (MSC) 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home locator record (HLR) and virtual locator record (VLR) that maybe used to implement different features of the illustrative embodiments.

The voicemail system 106 may be an integrated part of the MSC 102 or alternatively may be an externally connected device. In one embodiment, the voicemail system 106 may include an integrated database for storing customer and usage information and data. The voicemail system 106 may receive user input in order to receive, record, configure, and send an outbound greeting as further described herein. The user may interact or send and receive data, information, and commands through the telephones 122 and 124, wireless device 112 and 114, or the client 126. The mobile switching center 102 and voicemail system 106 may include any number of hardware and software components. In one embodiment, the MSC 106 is an advanced intelligence network device with software modules equipped to perform outbound greeting features and functions.

The local exchange 104 and MSC 102 communicate using a signal control protocol, such as a signaling system number 7 (SS7) protocol. The SS7 protocol is used in publicly switched networks for establishing connections between switches, performing out-of-band signaling in support of the call-establishment, billing, routing, and implementing information-exchange functions of the publicly switched network 134. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 maybe located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network VoIP works by sending voice information in digital form in packets, rather than in the traditional circuit-committed protocols of the publicly switched network.

The communications system 100 may further include any number of hardware and software elements that may not be shown in the example of FIG. 1. For example, in order to facilitate VoIP communications, the communications system and the MSC 102 and local exchange 104 in particular may include application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other components of a wire line network, such as a data, PSTN, VoIP, or other wired network may implement the outbound greeting features and perform the methods herein described.

The MSC 102 and the local exchange 104 may include an authentication space. The authentication space may be a partition of the server or other storage designated by the communications service provider. The authentication space may validate that a user or device, such as client 126, is allowed to authorize the MSC 102, local exchange 104, or corresponding voicemail system 106 and 108 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be used to create a secure connection between the client and the MSC 102 and the local exchange 104. The secure connection may be a virtual private network tunnel, an encrypted connection, firewall, or other form of secured communications link The MSC 102 and local exchange 104 may use any number of gateways, proxies, applications, or interfaces for allowing the client 126 to the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling or residence of a person or group that may use any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 114 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator. In another embodiment, the home telephone 124 may be integrated with a personal computer, such as client 126. The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications.

The client 126 may be a personal computer for performing and executing programs and instructions and accessing the wired network 118. However, the client 126 may be any computing devices suitable for communicating with the wired network 118. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. The MSC 102 and local exchange 104 may use a graphical user interface (GUI), such as website or program accessible from the client 126 in order to enter and receive input from the voicemail systems 106 and 108.

In an illustrative embodiment, the user may record an outbound greeting, enter user input, or receive a call using devices, such as wireless devices 112 and 114, home telephones 122 and 124, and client 126. Calls and other outbound greetings, messages, and data communications may be made and received from the home telephones 122 and 124, wireless devices 112 and 114, and client 126. At any time, a user may select to enable, order, initiate, configure, reconfigure or otherwise establish the outbound greeting and delivery parameters as herein described.

The user may record a outbound greeting in a number of ways. For example, the user may use a command that informs a function trigger of a device or the device itself, such as the MSC 102, local exchange 104, voicemail systems 105 and 106, wireless device 112 and 114, home telephones 122 and 124, or client 126, to record or select the outbound greeting and then subsequently deliver the outbound greeting. In one example, the user may submit a command to record the outbound greeting by dialing *2 on the home telephone 12. The command may also be a password, voice activated, time activated, preset by user selection or any other suitable option, setting, command, or user input.

Figure 2:
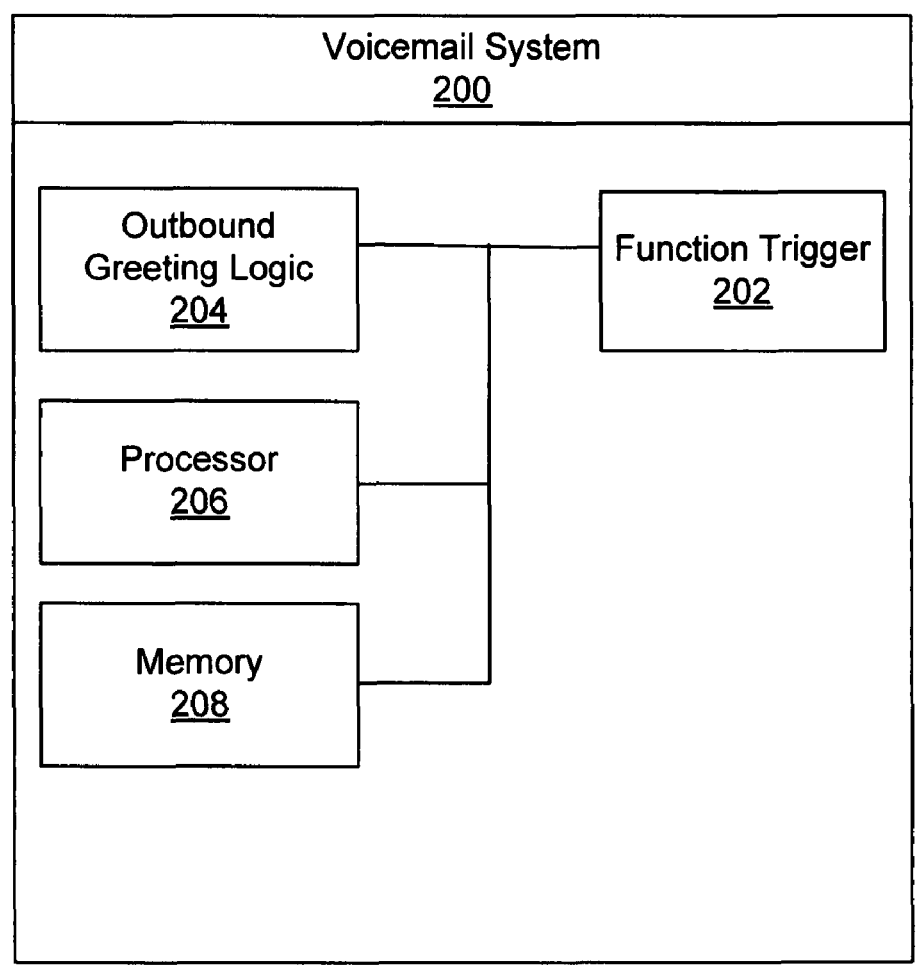
FIG. 2 is a block diagram of a voicemail system in accordance with an illustrative embodiment.

FIG. 2 is a block diagram of a voicemail system in accordance with an illustrative embodiment. In one embodiment, the voicemail system 200 is a particular implementation of the voicemail systems 106 or 108 of FIG. 1. The voicemail system 200 may include various elements, components, or modules, including a function trigger 202, outbound greeting logic 204, a processor 206, and a memory 208. In another embodiment, the voicemail system 200 may be integrated in a telephone, such as home telephones 122 and 124 or wireless devices 112 and 114. For example, the voicemail system may be a module executed by a smart phone. The voicemail system 200 may be a combination of hardware and software elements. The voicemail system 200 may use various structures and formats. The example shown in FIG. 2 is shown for illustration purposes only, and not as a limitation of required elements. The voicemail system 200 may be accessed by a user in order to receive, record, select, and store an outbound greeting for future playback to one or more specified recipients. The voicemail system 200 may process voice, text, video, picture and other media messages.

The voicemail system 200 may receive feedback from the user through a wireless or wireline telephone connection, or through a network connection. For example, using a personal computer, the user may access the voicemail system 200 to record a greeting, specify a recipient, and otherwise set preferences, as further illustrated in FIG. 6. The function trigger 202 may initiate the process to record and store or select the outbound greeting. In particular, the function trigger 202 may receive a signal, or user input that initiates the processes, features, and signals that may control creation and delivery of the outbound greeting.

The outbound greeting logic 204 may be used to receive user input and feedback from the recipient, configure user preferences, set a recipient, select a date and time for delivery, and otherwise ensure that the outbound greeting is recorded and played to the recipient, as specified by the user. The outbound greeting logic 204 may also access one or more messages pre-recorded by the user or available through a network or data connection. In one embodiment, a library of outbound messages professionally recorded or recorded by other wireless user may be available to the user either on the wireless device, through a data connection, or through the memory 208 of the voicemail system 200. For example, the user may download, send, or link to a celebrity impersonator of Marilyn Monroe singing "Happy Birthday." In another embodiment, the user may pre-record messages in the memory 208 for repeated usage and playback For example, a pre-recorded outbound greeting may include the user's own special rendition of Happy Birthday that is used for family and friends.

In one embodiment, the outbound greeting logic 204 maybe hard-wired circuit elements, or programmable circuitry and logic for performing the outbound greeting calling feature. In another embodiment, the outbound greeting logic 204 maybe integrated or stored within the memory 208 as a set of instructions. The set of instructions may be executed by the processor 206 to perform the outbound greeting process or activate a specialized feature. The processor 206 may be a computer processor, or other processing device used by the voicemail system to process instructions, and otherwise perform data manipulation and processing, as required by the voicemail system. In one embodiment, the voicemail system 200 may be one or more servers networked with a telecommunications service provider system to provide standard voicemail features, in addition to the outbound greeting feature and method as herein described.

Figure 3:
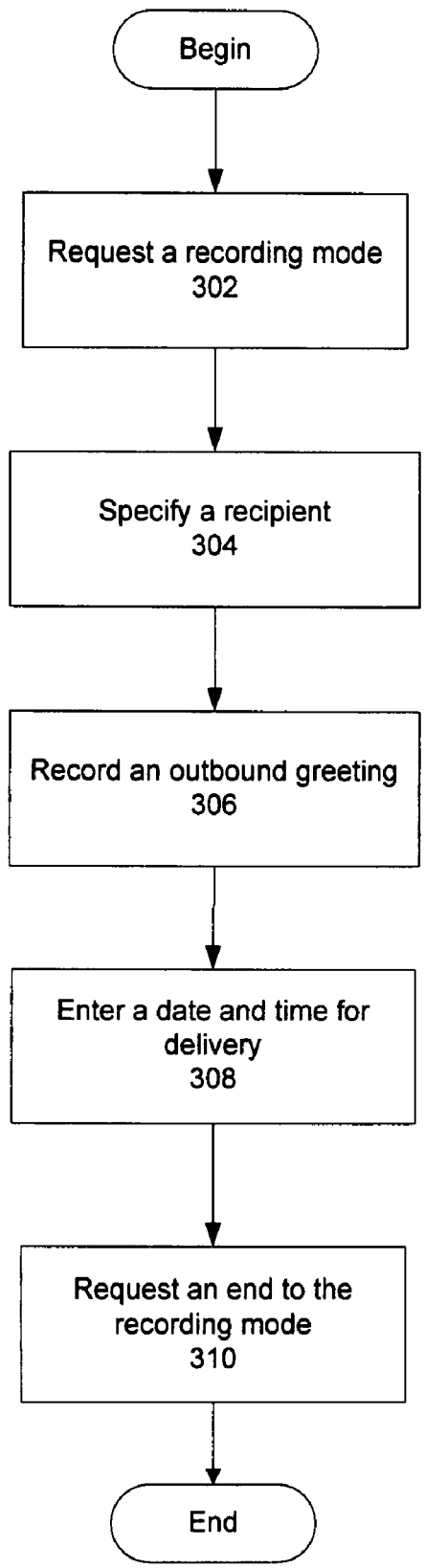
FIG. 3 is a is a flowchart of a process for receiving user input to record an outbound greeting.

FIG. 3 is a flowchart of a process for receiving user input to record an outbound greeting. The process of FIG. 3 maybe performed by a user. The user may access a computing device, client, or telephonic device to provide user input and perform, and otherwise generate commands or signals for selecting, recording, and entering delivery preferences for the outbound greeting. In one embodiment, the user may access a graphical user interface, such as a web browsing application, to enter the information preferences and other data that may be used to generate the outbound greeting.

The process of FIG. 3 may begin by requesting a recording mode (step 302). The request of step 302 may be generated once the user has gained access to a voicemail system through a telephonic connection, or a network connection. The user may be required to enter a user name, account number, password, pass-key, or other verifying information that allows the user to access the voicemail system. The user may request the recording mode or feature by toggling a button, selecting an icon, or otherwise generating a command electronically, or through a voice command. The recording mode may be specially designated to record one or more outbound greetings and receive user input coordinating delivery. In other embodiments, the user may select a pre-recorded greeting or commercially available greeting instead of recording the greeting as specified in FIG. 3.

Next, the user specifies a recipient (step 304). During step 304, the user may specify one or more recipients that are to receive an outbound greeting. The recipients may be specified using a phone number, user name, account number, IP address, or other personal identifier that may allow the voicemail system to subsequently deliver the outbound greeting. In one embodiment, the user may specify multiple phone numbers that may be used to contact the recipient. The user may also specify an order, or priority, in which the phone numbers are to be called for delivery of the outbound greeting. For example, the user may specify that a home phone number of the recipient is to be called first, followed by a cellular phone number, and as a tertiary back up, the work phone number of the recipient.

The user may specify the recipient in step 304 using an existing address book, phone number, or customized entry available on the wireless device, through the voicemail system, or other network location. Alternatively, the user may specify a nickname or provide other forms and methods of user input used for dialing the user as normal. For example, the user may use voice recognition to enter one or more names as recipients.

Next, the user records an outbound greeting (step 306). The user may be prompted by the voicemail system to begin recording the outbound greeting. For example, a prompt message or alert may inform the user that the voicemail system is now recording voice signals received from the user. In another embodiment, the user may provide a control signal indicating readiness to record the outbound greeting. For example, if the user is entering the outbound greeting from a wireless phone, the user may press "1" to begin recording, and "2" to end recording the outbound greeting.

In another example, if the user is recording the outbound greeting from a personal computer, the user may select a record button or icon to initiate recording and a stop button or icon to terminate the recording and store the outbound greeting. During step 306, the user may also be able to listen to the outbound greeting as recorded, select to re-record the greeting, or otherwise manipulate the recording of the outbound greeting. The user may also select a previously recorded message or commercially generated message through a menu or other interface. In another embodiment, the user may use sound editing applications to create the outbound greeting. The outbound greeting may also include pictures, videos, music, gift certificates, clip art, and other applications. For example, the outbound greeting may be a video message recorded by the user with a camera from a cell phone or webcam. The outbound greeting may include any available media and may be recorded in any available format for subsequent delivery.

Next, the user enters a date and time for delivery (step 308). The outbound greeting is particularly useful because the user may record the outbound greeting at a time and place convenient to the user. Additionally, the user may specify a date and time for delivery, rather than worrying about sending a message, or attempting to call the recipient on a given day. For example, if the user wants to call his or her sister to give a happy birthday message, the user may record the outbound greeting days, weeks, or months in advance, so that the sister knows the user has thought about her on her birthday.

The date and time entered in step 308 may be adjusted based on where the recipient lives or will otherwise be located at the date and time. For example, if the user wants the outbound greeting delivered on May 15, 2011, and the current date is Apr. 3, 2011, and the user knows the recipient lives in the Pacific time zone, and the user resides in the Mountain time zone, the voicemail system may automatically compensate so that an outbound greeting intended to be delivered at 8:00 a.m. is delivered at 8:00 a.m. Pacific time, and not 8:00 a.m. Mountain time.

During steps 304, 306, and 308, the user may also specify preferences for how and when the outbound greeting is delivered to the recipient. For example, the user preferences may include selections to ensure that the answering party is the designated recipient, the preferences may further provide the recipient the option to call the user, leave a message for the user, or end the call at any time, or the outbound greeting may be transferred to the recipient's voicemail if the recipient is unavailable, or the call from the voicemail system to the recipient may be attempted at specified intervals until the recipient is personally reached for delivery of the outbound greeting. Next, the user requests an end to the recording mode (step 310) with the process terminating thereafter.

Figure 4:
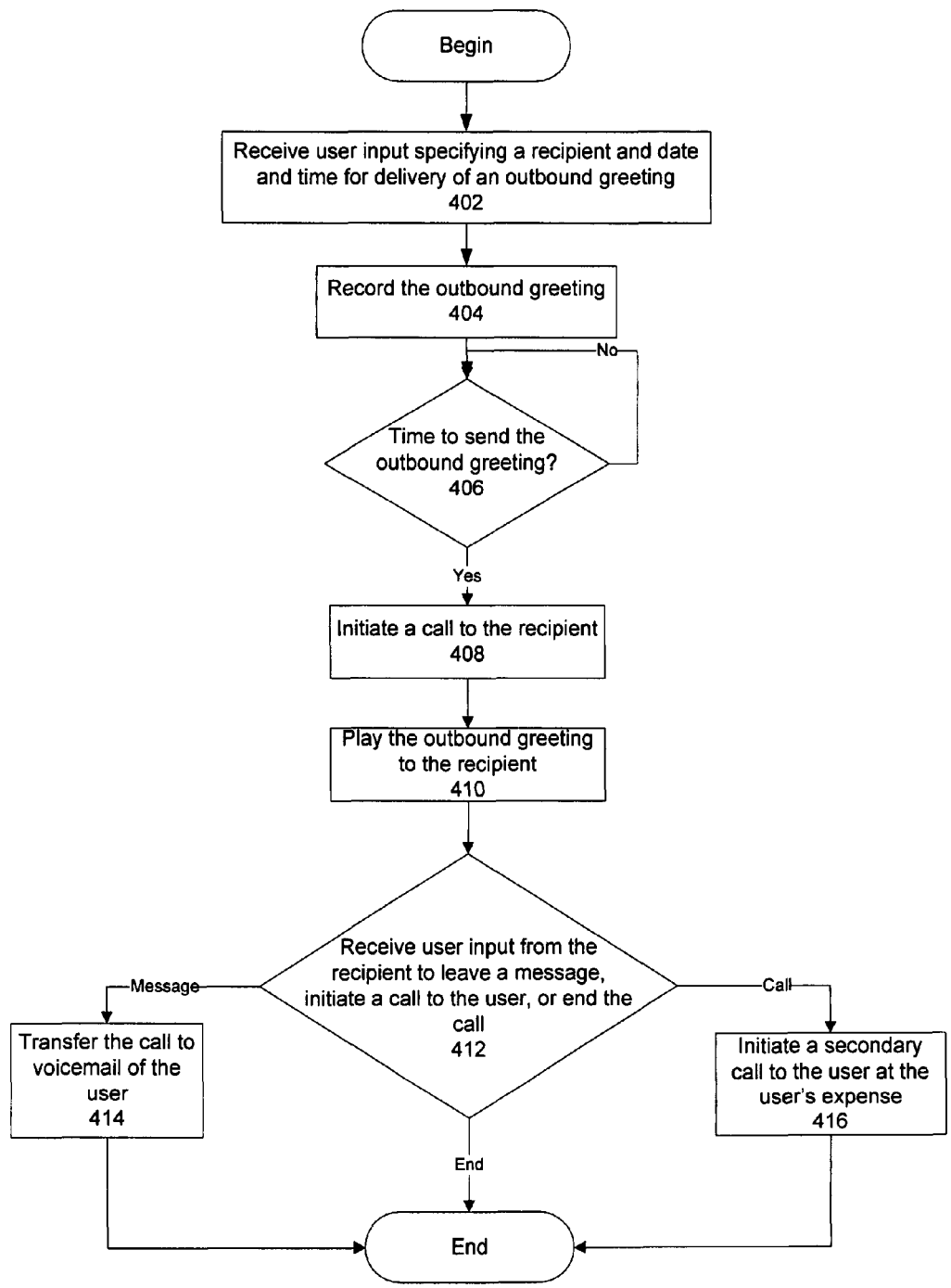
FIG. 4 is a flowchart of a process for playing an outbound greeting in accordance with an illustrative embodiment.

FIG. 4 is a flowchart of a process for playing an outbound greeting in accordance with an illustrative embodiment. The process of FIG. 4 may be implemented by a voicemail system or server based on data, information, or commands received from a user. In another embodiment, the process of FIG. 4 may be implemented by a telephone or computing device of the user. The process begins by receiving user input specifying a recipient and date and time for delivery of an outbound greeting (step 402). The user input may be received through a telephone, voice over Internet protocol telephone computing device, or other element for receiving signals or data from the user.

Next the voicemail system records the outbound greeting (step 404). Next, the voicemail system determines whether it is time to send the outbound greeting (step 406). The determination of step 406 is made based on the specified date and time provided by the user. For example, if the date and time specifies Oct. 21, 2012 at 9:00 a.m., the voicemail system does not send the outbound greeting until Oct. 21, 2012 at 9:00 a.m., or thereafter. If the determination of step 406 determines it is not time to send the outbound greeting, the determination of step 406 is repeated continuously. The outbound greeting is received by being recorded or selected.

Next, the voicemail system determines whether it is time to send the outbound greeting (step 406). The determination of step 406 is made based on the specified date and time provided by the user. For example, if the date and time specifies Oct. 21, 2012 at 9:00 a.m., the voicemail system does not send the outbound greeting until Oct. 21, 2012 at 9:00 a.m., or thereafter. If the determination of step 406 determines it is not time to send the outbound greeting, the determination of step 46 is repeated continuously.

If the voicemail system determines that it is time to send the outbound greeting in step 406, the voicemail system initiates a call to the recipient (step 408). The call may be initially placed to a first listed number of the recipient. For example, the user may have specified that the voicemail system is to call a home number of the recipient first.

Next, the voicemail system plays the outbound greeting to the recipient (step 410). In another embodiment, the voicemail system may first determine whether the answering party is the recipient based on a question or other identifier before playing the outbound greeting. For example, once the call is initiated in step 408, the voicemail system may repeat the question "Are you John's mother?" and then wait for a subsequent "yes" or "no" reply or a voice identification. If the recipient's identity is confirmed, the outbound greeting may be played as specified in step 410. The message may be played using a speaker, display, or other visual, audio, or tactile interface elements.

If the recipient's identity is not verified, the voicemail system may call the recipient later at specified intervals, or may transfer the outbound greeting directly to the voicemail or a messaging inbox of the recipient. In one embodiment, if the voicemail system determines that an answering machine or voicemail system of the recipient has answered the call, the voicemail system may record a message on the recipient's answering machine specifying that the outbound greeting is pending and detailing how the recipient may retrieve the outbound greeting. For example, the message recorded on the recipient's voicemail or answering machine may specify "You have a personal greeting from [User], press one to accept the call."

Once the outbound greeting is played to the recipient in step 410, the voicemail system receives user input from the recipient to leave a message, initiate a call to the user, or end the call (step 412). If the recipient selects to leave a message, the voicemail system transfers the call to a voicemail system of the recipient (step 414). For example, the recipient may use step 414 to leave a message or response to the outbound greeting for delivery to the user. In one example, the recipient may thank the user for sending a birthday greeting and suggest a time that they meet for dinner. In another embodiment, the recipient may send a text, video, picture, voice, or other media message. The message may also include an electronic gift or attachment.

In the event the recipient selects to initiate a call to the user in step 412, the voicemail system initiates a secondary call to the user at the user's expense (step 416). For example, after receiving the outbound greeting that congratulates the recipient on a wedding anniversary, the recipient may call the user to carry on a conversation or otherwise communicate. In one embodiment, the user may have set preferences so that any expenses associated with a secondary call or media message are billed to the user, rather than to the recipient. In one embodiment, the recipient is connected to the user as part of the call to the voicemail system. In the event the recipient selects to end the call in step 412, the process of FIG. 4 immediately terminates.

Figure 5:
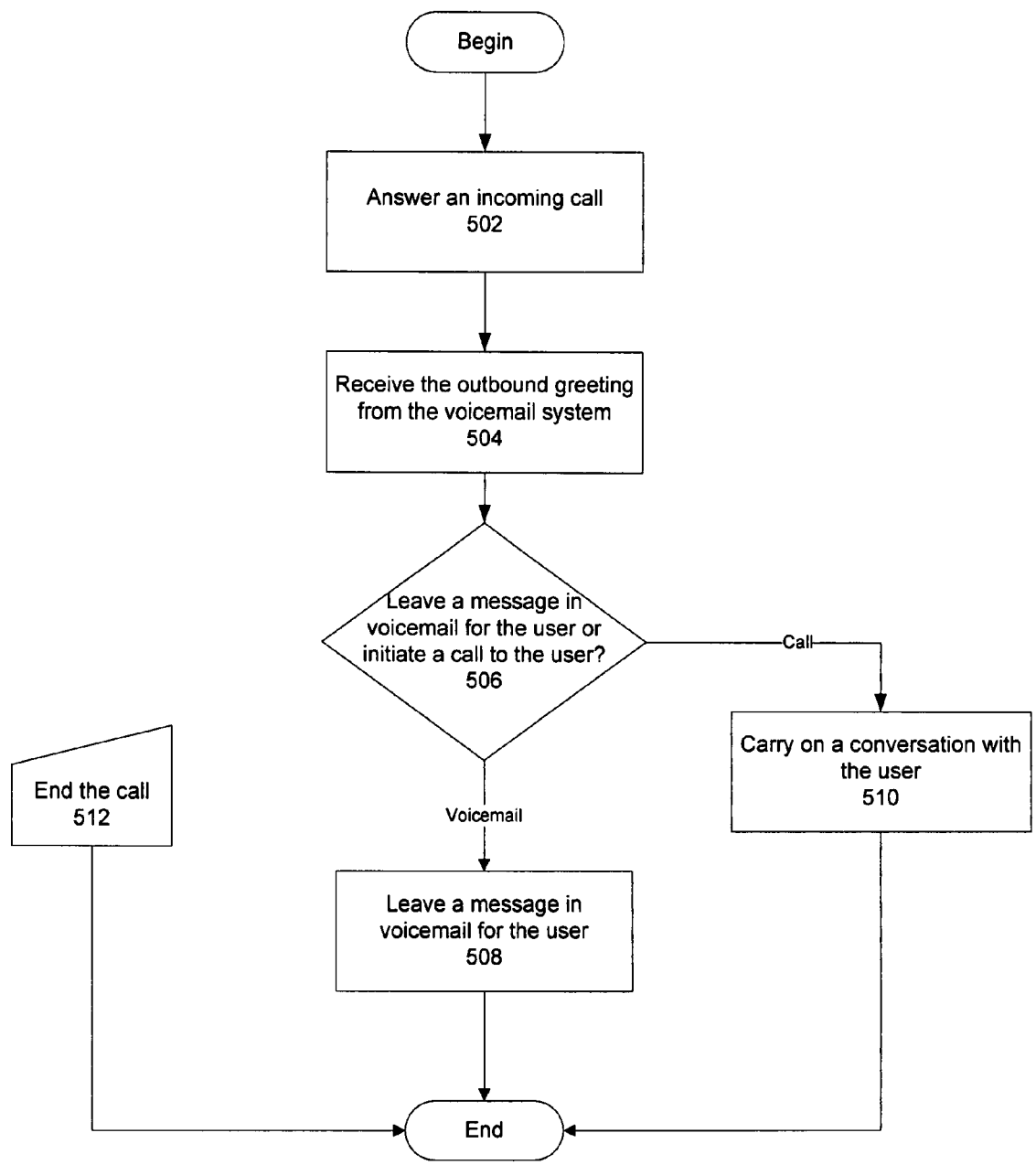
FIG. 5 is a flowchart of a process for a recipient receiving an outbound greeting in accordance with an illustrative embodiment.

FIG. 5 is a flowchart of a process for a recipient receiving an outbound greeting in accordance with an illustrative embodiment. The process of FIG. 5 may be implemented by a recipient. The recipient may use a wired or wireless telephone, or other voice communications device to receive information and provide feedback as described by FIG. 5. The process begins by answering an incoming call (step 502). The call of step 502 may be generated or originate from the voicemail system based on preferences and user input from the user.

The recipient receives the outbound greeting from the voicemail system (step 504). The outbound greeting may have been previously recorded by the user and a date and time for delivery established. In one embodiment, the recipient may be required to answer a question or verify his or her identity in order to receive the outbound greeting, in order to ensure that the outbound greeting is delivered to the individual or group specified by the user. The outbound greeting maybe received through an audio, visual, or tactile interface.

Next, the recipient determines whether to leave a message in voicemail for the user, or initiate a call to the user (step 506). If the recipient selects voicemail in step 506, the recipient leaves a message in voicemail for the user (step 508). The message of step 508 may be a response to the outbound greeting, or an answer to a question posed by the outbound greeting, or other message or information that the recipient desires to communicate to the user. The message may alternatively be video, other forms of voice, text, email, or electronically conveyed messages.

If the recipient elects to call the user in step 506, the recipient carries on a conversation with the user (step 510). The conversation of step 510 may occur dependent on whether the user is available to converse with the recipient based on the recipient's selection. At any time during the process of FIG. 5, the recipient may select to end the call (step 512), upon which the process is terminated. For example, if the person answering the call in step 502 is not the recipient, the answering party may end the call (step 512) so that the outbound greeting remains active and the voicemail system may attempt to deliver the outbound greeting at a later time as specified by the user or a specified or default interval or time period.

FIG. 6 is a graphical user interface for receiving user input for recording an outbound greeting in accordance with an illustrative embodiment. The outbound greeting graphical user interface 500 may be displayed to a user to record the outgoing greeting and select a delivery time and date and specify preferences for delivering the outgoing greeting. The outbound greeting GUI 500 may be displayed to a user through a computing device such as a personal computer, cellular phone, or PDA. The outbound greeting GUI 500 may include numerous elements including an account number 602, a user name 604, a password 606, a recording indicator 608, a recipient 610, including phone numbers 612, a date 612, a time 614, a record button 616, a stop button 618, and preferences 620.

The account number 602, the user name 604, and the password 606 may be used to authenticate the user as a party that is allowed to record and modify settings for the outbound greeting GUI 500. Any number of authentication elements, such as pass codes, voice identification, or biometric recognition devices maybe used to perform authentication of the user.

In one embodiment, the outbound greeting GUI 500 may include a recording indicator 608 that allows a user to actively select to record an outbound greeting. The elements of the outbound greeting GUI 500 may be interactive allowing a user to select lists, change configurations, or otherwise modify settings using user input through a mouse, voice recognition system, touch screen, or other electronic user interface. The recipient 610 may be the person to which the outbound greeting is destined to reach. For example, the phone numbers 612 may be used to contact the recipient. In one embodiment, the phone numbers may be selected from a drop down list of persons the user frequently calls or receives calls from. The outbound greeting GUI 500 may interface with other hardware and software elements to create or modify the outbound greeting. For example, the outbound greeting GUI 500 may allow access to video, sound, or picture editing applications, a web-cam, and other user applications and peripherals.

In another embodiment, the phone numbers 612 may be entered by a user based on signals from a keyboard or voice recognition system. The phone numbers 612 establish the order in which the recipient may be contacted. For example, the user may select to first try the recipient's wireless phone before the outbound greeting is attempted to be sent to the recipient's work phone. The phone numbers 612 may also include user names, account numbers, Internet protocol (IP) addresses, or other identifiers that may be used to place a call for delivery of the outbound greeting.

The outbound greeting GUI 500 may also include a date 612, and a time 614. The date 612 allows the user to select a specific calendar day for delivery of the outbound greeting. The time 614 similarly allows the user to specify an hour, minute, or even second for delivery of the outbound greeting. In one example, the date 612 and time 614 may include further details for specifying the recipient's location. As a result, the date and time for delivery may occur at the date 612 and time 614 for the time zone in which the recipient is located.

In one embodiment, the outbound greeting GUI 500 may allow a user to record the outbound greeting using the record button 616 and the stop button 618. For example, using an Internet connection, the words, text, or video of the outbound greeting may be recorded to the voicemail system. The recorded greeting may be subsequently processed or the device may perform the outbound greeting feature. Alternatively, the outbound greeting may be recorded to a wireless device, telephone, or other recording component available to the user. The outbound greeting may be subsequently transferred to the voicemail system or delivered directly to the recipient. In one embodiment, the user may select the record button 616 to begin recording the outbound greeting. Once the user has completed the outbound greeting, the user may select the stop button 618 to end recording the outbound greeting. The outbound greeting GUI 500 may include additional buttons or interface elements that allow the user to delete, edit, manipulate, or otherwise modify the outbound greeting before it is ready to be delivered to the recipient.

The outbound greeting GUI 500 may include the preferences 620 which further specify user settings, and preferences for delivery of the outbound greeting. In one embodiment, the user may select to have the recipient directly contact or call the user after the outbound greeting is played. The direct communication or connection may be a phone call, text message, or another outbound greeting from the recipient to the user. The user may specify whether the call or communication is to be billed to the user or to the recipient. For example, the user may want to pay for a call that comes in response to an outbound greeting that has been delivered. In one embodiment, the voicemail system may play a message specifying that the user will be paying for a call to the user if selected by the recipient. The recipient may also be prompted to leave a message for the user. The message may be a voicemail, text, or email message that is sent from the recipient to the user in response to receiving the outbound greeting. In one embodiment, the user may use a Boolean selection to indicate to perform the features or preferences in an 'a, b, or c', format or in an 'a and b' format. For example, once the call is made, the recipient may allow voicemail as a response, only allow a phone call, or allow the recipient to choose. Alternatively, the user may use the preferences 620 to permit any combination of the options which may include 'a, b, and c'.

The preferences 620 may also allow the user to specify whether the outbound greeting may be transferred directly to voicemail of the recipient if the recipient is personally unavailable to receive the outbound greeting or answer a call to which the outbound greeting is attached. The user may also select to retry delivery of the outbound greeting if the initial attempt is unsuccessful. In one example, the preferences 620 may allow the user to specify an interval or time period used for subsequent attempts to contact the recipient. For example, if the recipient is unavailable, or does not answer the call associated with the outbound greeting from the voicemail system, the voicemail system may attempt to contact the recipient for personal delivery every 45 minutes until the outbound greeting is successfully delivered.

The preferences 620 may also be used to set a number of re-attempt tries that are used before the outbound greeting is sent to a voicemail, video-mail, text, or email inbox of the recipient, or other actions are performed. In one example, the voicemail system may report that delivery was unsuccessful and state the purpose for the failed delivery, such as a wrong number, the recipient is unavailable or does not have voicemail, or other criteria.

The illustrative embodiments allow the user the convenience of sending a message or outbound greeting at the convenience of the user. As a result, the user may easily record any number of outbound greetings to be played to specified recipients in order to promote personal, business, social, or other relationships that are important to the user. The system and method for outbound greeting provides the user enhanced methods of communication using predefined criteria and specifications that allow for enhanced communications and better delivery methods.

The previous detailed description is of a small number of embodiments for implementing the invention and is not intended to be limiting in scope. The following claims set forth a number of the embodiments of the invention disclosed with greater particularity.

What is claimed:

1. A method for sending an outbound greeting, the method comprising:
   receiving user input specifying a recipient including one or more numbers associated with the recipient, an order of calling priority for calling the one or more numbers, a date, and a time for delivery of the outbound greeting, and conditions for transferring the outbound greeting to a voicemail system of the recipient in response to reaching a number of failed attempts to contact the recipient;
   receiving the outbound greeting, the outbound greeting is capable of being user recorded and selected from a library of available outbound greetings;
   storing the outbound greeting for future delivery;
   initiating a call to the one or more numbers associated with the recipient according to the order of calling priority in response to the date and the time specified by the user input being met; and
   transferring the outbound greeting to the voicemail system of the recipient in response to the recipient not personally answering the call and in response to the conditions.

2. The method according to claim 1, further comprising:
   playing the outbound greeting to the recipient in response to the call being completed to one of the one or more numbers associated with the recipient.

3. The method according to claim 2, further comprising:
   confirming a person answering the call is the recipient, wherein the outbound greeting is only played if the call is answered personally by the recipient.

4. The method according to claim 1, further comprising:
   performing a call response based on feedback from the recipient.

5. The method according to claim 4, wherein the call response initiates a secondary call from the recipient to the user.

6. The method according to claim 5, wherein expenses associated with the secondary call are billed to the user.

7. The method according to claim 4, wherein the call response transfers the recipient to a voicemail system of the user.

8. The voicemail server according to claim 7, wherein the set of instructions perform a call response, the call response is capable of being transferring the call to a messaging inbox of the user, initiating a secondary call to the user from the recipient at the expense of the user, and ending the call.

9. The method according to claim 4, wherein the call response terminates the call and the outbound greeting.

10. The method according to claim 1, wherein the user input specifies a time interval for calling the one or more numbers until the call is answered personally by the recipient for delivery of the outbound greeting.

11. The method according to claim 1, further comprising:
    reporting to a user delivery or nondelivery of the outbound greeting to the recipient.

12. The method according to claim 1, further comprising:
    determining whether the person answering the call is the recipient in order to determine whether the call is personally answered by the recipient.

13. The method according to claim 1, wherein the outbound greeting is capable of being recorded from any of a telephone, a wireless device, or a computing device, the date and the time are converted to a corresponding date and time for the recipient according to a time zone of the recipient.

14. A voicemail system for processing an outbound greeting, the voicemail system comprising:
- a function trigger for initiating an outbound greeting feature in response to receiving user input specifying a recipient including one or more numbers associated with the recipient, an order of calling priority for calling the one or more numbers, a date, and a time for delivery of the outbound greeting, and conditions for transferring the outbound greeting to a voicemail system of the recipient in response to reaching a number of failed attempts to contact the recipient; and
- outbound greeting logic configured to store the outbound greeting received from a user for future delivery and initiate a call to the one or more numbers associated with the recipient according the order of calling priority to deliver the outbound greeting in response to the date and the time specified by the user input being met, wherein the outbound greeting is capable of being user recorded and selected from a library of available outbound greetings, and wherein outbound greeting is transferred to the voicemail system of the recipient in response to the recipient not personally answering the call and in response to the conditions.

15. The voicemail system according to claim 14, wherein the outbound greeting logic is configured to play the outbound greeting to the recipient and perform a call'response based on feedback from the recipient.

16. The voicemail system according to claim 14, further comprising:
- a graphical user interface in communication with the outbound greeting logic for receiving the user input from a client accessible by the user.

17. The voicemail system according to claim 14, wherein the voicemail system is integrated with any of a digital packet network, wireless network, and a plain old telephone service network, and wherein the date and the time are converted to a corresponding date and time for the recipient according to a time zone of the recipient.

18. A voicemail server comprising:
- a processor for executing a set of instructions; and
- a memory for storing the set of instructions, wherein the set of instructions are configured to:
  - receive user input specifying (a) a recipient including one or more numbers associated with the recipient, an order of calling priority for calling the one or more numbers, (b) a date, and a time for delivery of the outbound greeting, and (c) conditions for transferring the outbound greeting from the voicemail server to a voicemail system of the recipient in response to the recipient not answering the call to the one or more numbers,
  - record the outbound greeting for future delivery, the outbound greeting is capable of being user recorded and selected from a library of available outbound greetings,
  - initiate a call to the one or more numbers associated with the recipient according to the order of calling priority in response to determining the date and the time specified by the user input are met, and
  - transfer the outbound greeting to a voicemail system of the recipient in response to the recipient not personally answering the call and in response to the conditions.

19. The voicemail server according to claim 18, wherein the set of instructions play the outbound greeting to the recipient in response to the call being completed to one of the one or more numbers associated with the recipient.

20. The voicemail server according to claim 18, wherein the set of instructions are further configured to:
- play the outbound greeting to the recipient, and perform a call response in response to verifying that a party answering the call is the recipient based on feedback from the recipient.

* * * * *